June 12, 1928.
C. A. JOHNSON
1,673,362
SCREW DRIVING MACHINE
Filed Oct. 6, 1924
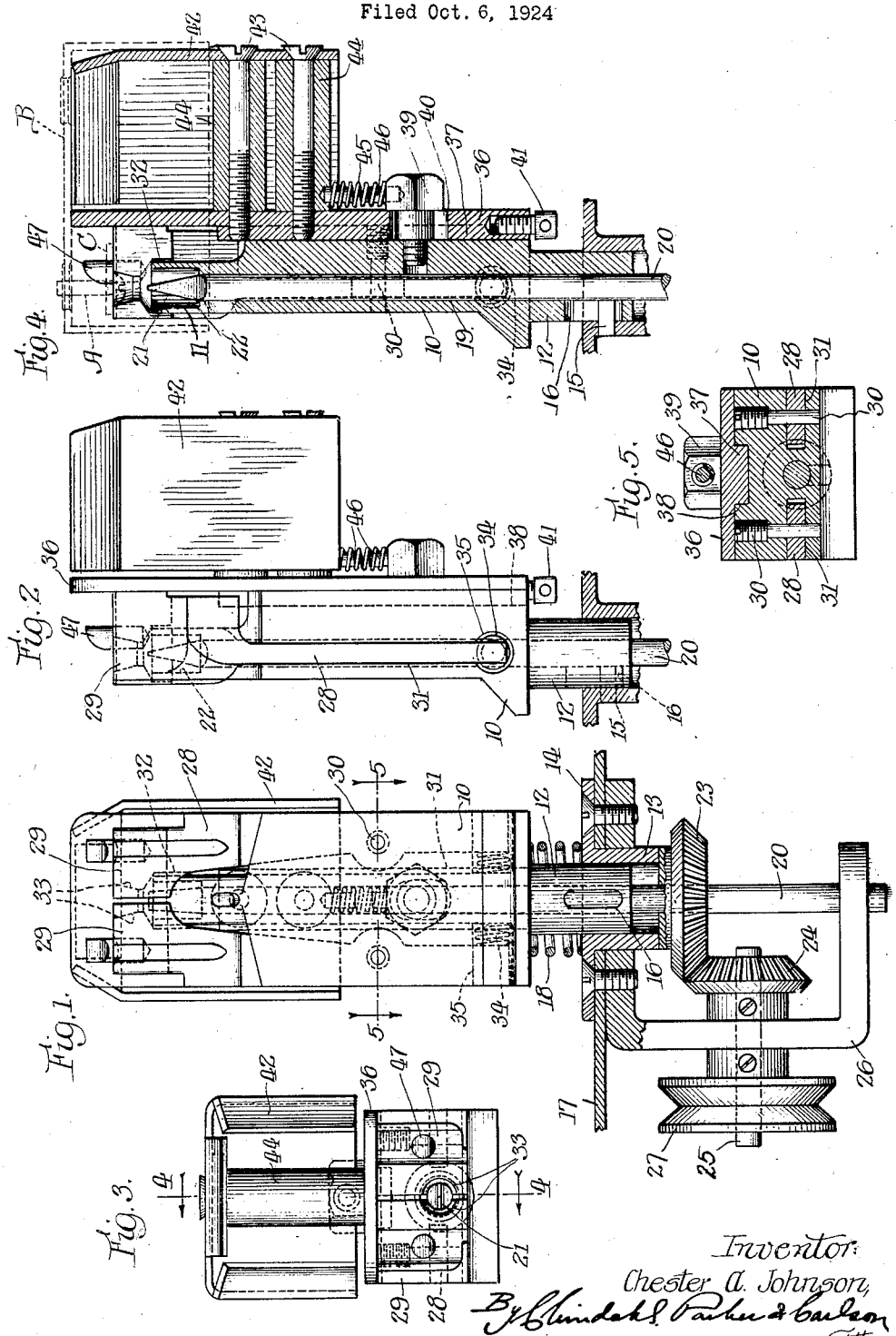
Inventor
Chester A. Johnson,
By Lindahl, Parker & Carlson
Attys Patented June 12, 1928.

1,673,362

UNITED STATES PATENT OFFICE.

CHESTER A. JOHNSON, OF CHICAGO, ILLINOIS, ASSIGNOR TO CHICAGO FUSE MFG. COMPANY, OF CHICAGO, ILLINOIS, A CORPORATION OF ILLINOIS.

SCREW-DRIVING MACHINE.

Application filed October 6, 1924. Serial No. 741,789.

My invention relates to improvements in screw driving machines.

The general objects of my invention reside in the provision of a novel screw driving machine which can be operated at a high rate of speed and with facility to obtain a large quantity production, which is accurate and efficient in use, and which is simple in construction and capable of accommodating screws and work parts of different kinds, shapes, and sizes.

Further objects reside in the provision of a machine of the above character which requires but little skill and precision to operate, and has a low initial cost and cost of upkeep thereby resulting in a low cost of production; and in which indifferent and careless handling will not endanger the operator or result in injury to the parts.

Still another object is to provide a screw driving machine having a new and improved screw clamping or holding means which permits a ready entry of the screw head and serves to properly aline the shank with the driver.

Further objects and advantages will become apparent as the description proceeds.

Referring to the drawings, Figure 1 is a front elevation of a machine constructed in accordance with my invention.

Fig. 2 is a side view.

Fig. 3 is a top view.

Fig. 4 is a vertical section taken along line 4—4 of Fig. 3.

Fig. 5 is a horizontal section taken along line 5—5 of Fig. 1.

While my invention is susceptible of various modifications and alternative constructions, I have shown in the drawings and will herein describe in detail the preferred embodiment, but it is to be understood that I do not thereby intend to limit the invention to the particular form disclosed, but aim in the appended claims to cover all other forms falling within the spirit and scope of the invention.

Referring to the exemplary embodiment of the invention illustrated in the drawings, 10 represents the body of the machine. Preferably, the body is rectangular in shape, and is provided with cylindrical extensions 11 and 12 at the top and bottom. The lower extension 12 extends slidably into a sleeve 13 formed on a guide plate 14, and is held against rotation by a pin 15 engaging in a slot 16 formed in its side. The plate 14 can be mounted on any suitable support, and is herein shown secured to a work table 17. A coil spring 18 positioned on the extension 12 and abutting at its opposite ends against the plate 14 and the lower end of the body 10 tends to hold the latter resiliently in its uppermost position.

Extending through a bore 19 in the body 10 and extensions 11 and 12 is a spindle 20 having a point 21 at its upper end located in an enlargement 22 of the bore 19, and constituting the screw driver of the machine. Rigidly secured to the spindle 20 and bearing against the lower edge of the sleeve 13 is a bevel gear 23 that meshes with a bevel gear 24 on a stub shaft 25. The latter is journaled in a bearing bracket 26 secured to the lower side of the table 17, and is adapted to be driven by a pulley 27 deriving power from any suitable source. Any other suitable means for driving the spindle 20 can be provided if desired.

Two jaw members 28 having opposed jaws 29 at their upper ends are pivotally mounted on pins 30 and in deep narrow grooves or channels 31 formed in opposite sides of the body 10. The jaws 29 are provided with semicylindrical channels 32 enclosing the extension 11, and are formed with complementary clamping faces 33 constituting a conical socket which opens into the enlargement 22 and is adapted to receive and clamp the head of a screw. A screw A is shown in dotted outline in Fig. 4. The jaw members 28 can readily be changed to take care of screws of different kinds, sizes, and shapes. A pair of coil springs 34 are mounted in two transverse alined bores 35 in opposite sides of the body 10, and abut against the lower ends of the jaw members 28 to resiliently move the jaws 29 toward each other. These springs are made of a strength allowing a fairly easy entry of the screw, but sufficient to clamp the screw accurately in place. The inclined jaw faces 33 permit the ready entry of an inclined screw by moving one jaw 29 more than the other, and serve to aline the screw with the spindle 20. Upon moving the body 10 down on the spindle 20 against the spring 18, the head of the screw is adapted to be engaged by the point 21 of the screw driver.

The work part into which the screw A is to be threaded is adapted to be mounted on a work carrier which comprises a slide or plate 36. This slide is provided with a longitudinal guide 37 that engages in a way 38 in the rear surface of the body 10 and which is held against displacement by a headed pin 39 that extends slidably through an elongated slot 40 in said slide into threaded engagement with said body. An adjustable stop screw 41 is threaded into the lower edge of the slide 36, and limits its downward movement toward the table 17. The stop screw 41 serves as a means whereby the distance through which the screw A is to be turned can be regulated, and avoids breakage when the body 10 is held down by preventing the screw A from being turned tight, the latter in such event turning beyond the reach of the screw driver. This construction permits a gear drive for the spindle 20 to be used in place of the usual friction drive.

A support 42 of suitable construction is secured to the back of the slide 36 by screws 43 extending through spacers 44 to properly locate and support the work parts with reference to the screw driver, and in the present instance is channel-shaped in cross-section with the upper ends of the legs and the back bent inwardly to adapt it for electrical switch boxes with which conduit clamps are to be assembled. A switch box B and a clamp C are shown in dotted outline in Fig. 4. A coil spring 45 fitting over a pair of pins 46 secured respectively to the head of the pin 39 and the lower spacer 44 tends to maintain the work carrier in its uppermost position on the body 10.

A guide pin 47 is secured to the upper end of each jaw 29 for the purpose of correctly locating the conduit clamp C over the jaw faces 33 with the screw aperture fitting over the shank of the screw A.

In operation, the head of the screw A is inserted between the conical jaw faces 33. A switch box B is then placed on the support 42, and a conduit clamp C is positioned on the pins 47. The work carrier and the body 10 are now pressed down to bring the switch box against the threaded end of the screw, and the screw driver into engagement with the screw head. Downward movement of the work carrier on the body 10 is limited by the pin 39 and slot 40, and of the body 10 by the stop screw 41. The rate at which the work carrier is pressed down need not be correlated to the speed of the screw driver, and can be efficiently controlled by the touch of the operator, thereby simplifying the operation.

In general, the screw driving machine has a large capacity output, and can be operated by unskilled workers. The construction is simple and inexpensive, and all dangerous moving parts are covered to prevent injury to the operator.

I claim as my invention:

1. A screw driving machine having, in combination with a support, a body mounted for reciprocation toward and from said support, a spring tending to move said body from said support, a screw driver extending rotatably and slidably into said body, a pair of spring pressed jaws pivotally mounted in said body and defining a screw receiving socket directly over the point of said screw driver, a carrier slide slidably mounted on said body and having a support for holding a work part, spring means resisting the downward movement of said slide, and means for limiting the movement of said body toward said first mentioned support.

2. A screw driving machine having, in combination, a support, a body movable toward and from said support, a screw driver extending rotatably and slidably into said body, means for rotating said screw driver, clamping means mounted on said support and defining a screw receiving socket directly in alinement with the point of said screw driver, and a work carrier slidably mounted on said body.

3. A screw driving machine having, in combination with a support, a screw driver rotatably mounted in said support, a body having a bore receiving said screw driver and allowing relative rotary and sliding movement thereof, a pair of spring pressed clamping members mounted on said body for supporting a screw in alinement with the point of said screw driver, and a work carrier slidably mounted on said body for moving a work part against the screw.

4. A screw driving machine having, in combination with a support, a body mounted for movement toward and from said support, spring means for moving said body from said support, a screw driver extending into said body, means for driving said screw driver, screw clamping means mounted on said body, a slide mounted on said body and having a pin and slot connection therewith, spring means opposing the relative movement of said slide in one direction, and a work holder supported by said slide.

5. A screw driving machine having, in combination with a support, a body, a screw driver extending into said body for relative rotary and sliding movement, a pair of spring pressed clamping jaws mounted in said body for supporting a screw in alinement with the point of said screw driver, relative sliding movement of said body permitting engagement of said screw by said driver, a work carrier movably mounted on said body, movement of said carrier on said body permitting engagement of the work with said screw, and adjustable means acting through said carrier for limiting the relative sliding movement of said body and said driver.

6. A screw driving machine having, in combination with a support, a body movably mounted on said support, a screw driver extending into and substantially through said body for relative rotary and sliding movement, a pair of clamping members pivotally mounted midway of their ends in opposite sides of said body, spring means for pressing the lower ends of said clamping members apart, screw clamping jaws formed on the upper end of said clamping members, relative sliding movement of said body permitting engagement of said screw by said driver, and work locating means movable on said body for presenting work to the screw.

7. A screw driving machine having, in combination with a support, a body having upper and lower extensions, of which the lower extension is slidably and nonrotatably mounted in said support, spring means for moving said body from said support, a screw driver rotatably but nonslidably mounted in said support and extending into said body through said lower extension, a pair of jaw members embracing said upper extension, and defining a yielding socket over the point of said screw driver, and means for yieldingly supporting a work part over said socket.

8. A screw driving machine having, in combination with a support, a body slidably mounted in said support, a screw driver extending into said body, spring pressed clamping means for holding a screw over the end of said screw driver, means resisting the movement of said body toward said support, a work carrier slidably mounted on said body for supporting a work part over the screw, means for limiting the relative movement of said body and said work carrier, and means for limiting the movement of said work carrier toward said support.

9. A work carrier having, in combination with a support, a body having an extension slidably mounted in said support, spring means resisting the movement of said body toward said support, screw clamping means on said body, a work holder slidably mounted on said body, means for limiting the relative movement of said body and said work holder, and means for limiting the movement of said body toward said support.

10. A screw driving machine having, in combination, a support, means on said support for engaging and supporting a screw part, means for rotating said screw part, said means being movable relative to said support to bring said screw part and said rotating means into operative relation, means on said first mentioned means for supporting a work part, said last mentioned means being movable on said first mentioned means to move said work part into engagement with said screw part, and spring means tending to return said first mentioned means and said work supporting means to their inoperative position.

11. A screw driving machine having, in combination, a body, a screw driver rotatably and slidably mounted in said body, screw clamping means on said body adapted to support a screw for engagement by said driver upon relative sliding movement between said body and said driver, a work holder slidably mounted upon said body for presenting a part to said screw, spring means tending to press said holder away from said driver, and means for limiting the movement of said holder on said body.

12. A screw driving machine having, in combination, a body, a screw driver rotatably and slidably mounted in said body, screw clamping means on said body adapted to support a screw for engagement by said driver upon relative sliding movement between said body and said driver, a work holder slidably mounted upon said body for presenting a part to said screw, spring means tending to press said holder away from said driver, and means for limiting the position of said holder with respect to the position of said driver.

13. A screw driving machine having, in combination, a body, a screw driver extending into said body for relative rotary and sliding movement, screw holding means on said body adapted to support a screw for engagement by said driver upon relative movement of said body and said driver, means on said first mentioned means for positioning a work part adapted to receive said screw, and means on said body for positioning a second work part adapted to receive said screw.

In testimony whereof, I have hereunto affixed my signature.

CHESTER A. JOHNSON.